US008432878B2

(12) United States Patent
Wang et al.

(10) Patent No.: US 8,432,878 B2
(45) Date of Patent: Apr. 30, 2013

(54) METHOD AND APPARATUS FOR WIRELESS COMMUNICATION

(75) Inventors: Chun-Yen Wang, Tainan (TW); Chie-Ming Chou, Taichung County (TW); Chi-Fang Li, Miaoli County (TW)

(73) Assignee: Industrial Technology Research Institute, Hsinchu (TW)

( * ) Notice: Subject to any disclaimer, the term of this patent is extended or adjusted under 35 U.S.C. 154(b) by 817 days.

(21) Appl. No.: 12/428,116

(22) Filed: Apr. 22, 2009

(65) Prior Publication Data

US 2009/0274134 A1  Nov. 5, 2009

Related U.S. Application Data

(60) Provisional application No. 61/071,519, filed on May 2, 2008.

(51) Int. Cl.
*H04W 4/00* (2009.01)
*H04W 74/00* (2009.01)

(52) U.S. Cl.
USPC ....... 370/338; 455/561; 455/3.01; 455/67.11; 455/452.1; 455/434; 455/429

(58) Field of Classification Search .......... 370/241, 370/281, 318, 335, 337, 350, 338; 455/432.3, 455/450, 33.1, 34.1, 53.1
See application file for complete search history.

(56) References Cited

U.S. PATENT DOCUMENTS

| | | | | |
|---|---|---|---|---|
| 5,774,790 A | * | 6/1998 | Dupuy | 370/337 |
| 5,911,122 A | * | 6/1999 | Corriveau et al. | 455/432.3 |
| 6,717,930 B1 | * | 4/2004 | Sezgin et al. | 370/335 |
| 6,792,274 B1 | * | 9/2004 | Kapanen | 455/450 |
| 6,888,805 B2 | | 5/2005 | Bender et al. | |
| 6,950,423 B2 | | 9/2005 | Kawakami et al. | |
| 2001/0043572 A1 | * | 11/2001 | Bilgic et al. | 370/281 |
| 2002/0105913 A1 | * | 8/2002 | Miya | 370/241 |
| 2004/0014477 A1 | * | 1/2004 | Ishiguro et al. | 455/450 |
| 2007/0274203 A1 | | 11/2007 | Kimura et al. | |
| 2008/0182572 A1 | * | 7/2008 | Tseytlin et al. | 455/427 |

FOREIGN PATENT DOCUMENTS

| | | |
|---|---|---|
| CN | 1332542 A | 1/2002 |
| EP | 1 093 238 A2 | 4/2001 |
| EP | 1170881 A1 | 4/2001 |
| JP | 2001-119743 | 4/2001 |
| JP | 2001-231062 | 8/2001 |
| JP | 2003-259413 | 9/2003 |
| JP | 2003-289561 | 10/2003 |

OTHER PUBLICATIONS

Hamiti, Shkumbin, "The Draft IEEE 802.16m System Description Document", IEEE 802.16 Broadband Wireless Access Working Group, Apr. 30, 2008.
Chinese Patent Office Action dated Nov. 1, 2010 in Chinese Application No. 200910138519.5, 7 pages.

* cited by examiner

*Primary Examiner* — Andrew Lai
*Assistant Examiner* — Biniyam Alemayehu
(74) *Attorney, Agent, or Firm* — Finnegan, Henderson, Farabow, Garrett & Dunner, LLP

(57) ABSTRACT

A communication network includes a plurality of network interface devices each covering a respective one of a plurality of cells. Each of the plurality of network interface devices communicates with communication entities in the respective cell using radio frames of the respective cell. The radio frames of a first one of the plurality of cells are shifted in time with respect to the radio frames of a second one of the plurality of cells.

21 Claims, 12 Drawing Sheets

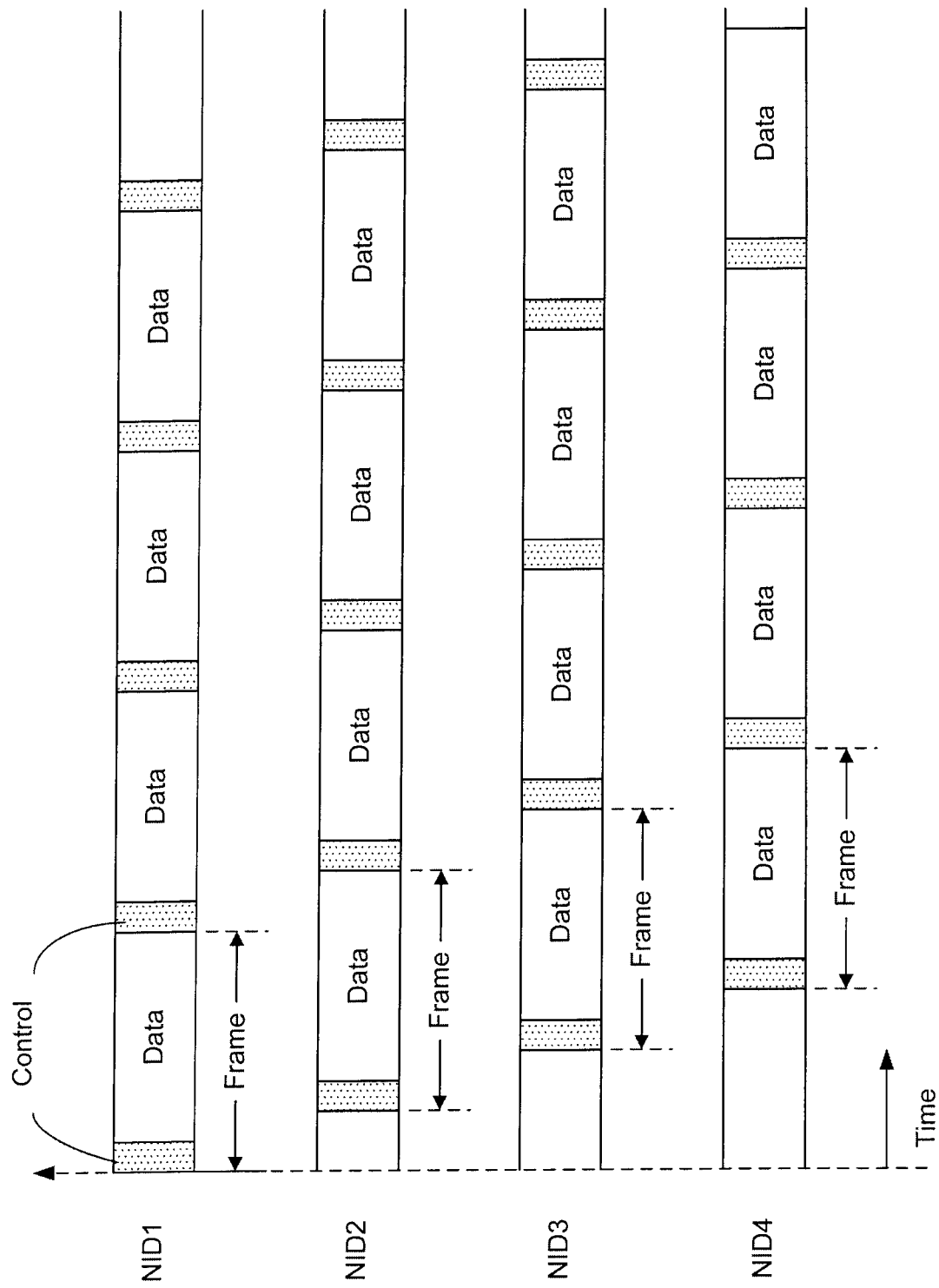

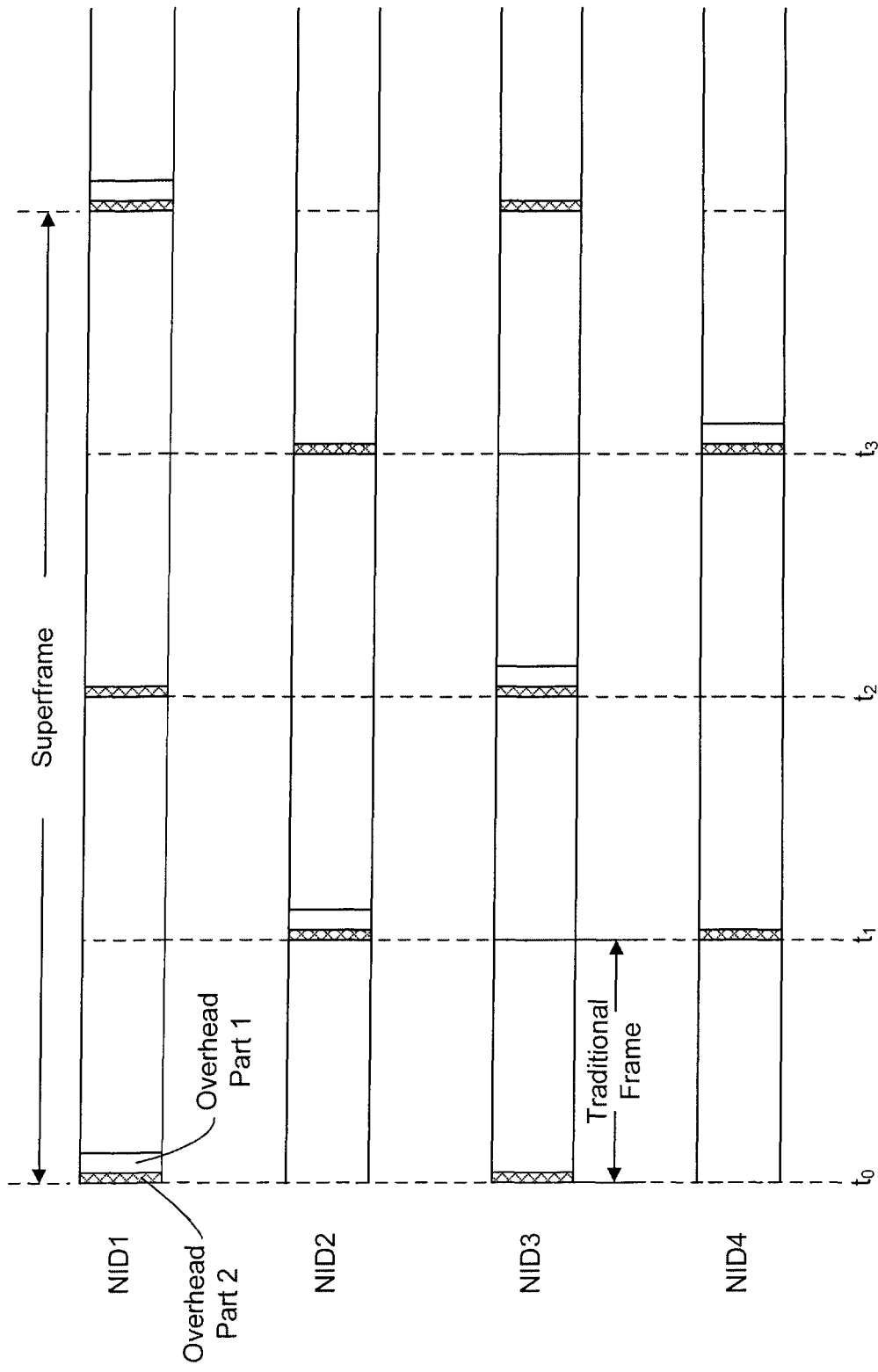

METHOD AND APPARATUS FOR WIRELESS COMMUNICATION

BENEFIT OF PRIORITY

The present application is related to, and claims the benefit of priority of, U.S. Provisional Application No. 61/071,519, filed on May 2, 2008, entitled "Methods and Mechanisms for Misaligned Frame Transmissions in Wireless Communication Systems," the entire contents of which are incorporated herein by reference.

FIELD OF THE INVENTION

This invention relates in general to methods and apparatus for wireless communication.

BACKGROUND

Several types of communications networks exist today, including, for example, computer networks such as wide area networks (WANs), metropolitan area networks (MANs), local area networks (LANs), and personal area networks (PANs), and cellular networks. User terminals may communicate with the networks wirelessly, e.g., through radio frequency (RF) connections or infrared (IF) connections. The interface between a network and such wireless user terminals is generally called an air interface. Interface devices exist on both sides of the air interface. The interface device in the user terminal may be a wireless adapter, a cellular phone, etc. The interface device in the network may be a base station, a femtocell base station, a home base station, a relay station, an access point, an access network, etc. A network generally contains multiple network interface devices, each covering a certain area called a cell and communicating with user terminals within that area.

Network interface devices and user terminals exchange data in the form of frames, which are transmitted at specified times with specified time intervals. A frame, or a radio frame, is a data unit upon which a network operates, and consists of a number of bits of information including user data and/or overhead information. With the common knowledge of frame configuration, i.e., the structure and timing of radio frames, network interface devices and user terminals can intelligently communicate with each other.

Typically, network interface devices in a network operate with the same frame structures and the same frame timing. FIG. 1 illustrates a conventional frame configuration in a network with four network interface devices NID1, NID2, NID3, NID4. The frames of network interface devices NID1, NID2, NID3, NID4 not only have the same size, but are substantially aligned to one another in time.

As shown in FIG. 1, each frame configuration includes a plurality of radio frames. Each radio frame may include a control portion and a data portion. Overhead information is transmitted in the control portion, and user data are transmitted in the data portion of a frame. The overhead information may include synchronization signals, such as preambles, mid-ambles, post-ambles, reference signals, etc., that allow user terminals and the network interface devices to synchronize and maintain synchronization with each other. The overhead information may also include system information such as the identity of the network interface device, service options supported by the network interface device, and system parameters, etc. The overhead information may also include resource allocation information, such as downlink map (DL-MAP), uplink map (UP-MAP), multicast and broadcast service map (MBS-MAP), etc., that provide uplink and downlink slot allocations within a radio frame. A network interface device may broadcast the overhead information such that all user terminals within its cell can receive such information.

A wireless communication system defined by the IEEE 802.16e standard has a frame configuration similar to the one shown in FIG. 1. In an IEEE 802.16e system, each radio frame is divided into two subframes. One of the subframes is used for uplink transmission and the other for downlink transmission. Uplink transmission refers to the transmission from a user terminal to the network interface device, and downlink transmission refers to the transmission from the network interface device to the user terminal.

Before a user terminal can communicate with a network, the user terminal may first detect a network interface device by searching for the overhead information in the control portions from that network interface device. The user terminal may synchronize to the network interface device using the synchronization signals in the control portions and obtain such other system information as system parameters, supported services, etc. Thereafter, the user terminal may establish a communication session with the network through the network interface device.

Once the communication session is established, the user terminal may use the overhead information in the control portion of the radio frames to maintain synchronization to the network interface device and to update system information pertinent to the communication session. A mobile user terminal may also evaluate signal strengths of several network interface devices by measuring the broadcast signals in the control portion of radio frames from these network interface devices. If the evaluation indicates that a network interface device other than the one currently communicating with the user terminal will be able to provide a better connection quality, the user terminal or the network may decide to continue the communication session through such other network interface device. This process of switching the communication session from one network interface device to another is commonly referred to as handover.

Oftentimes, handover is necessary when a mobile user terminal moves out of the cell of the network interface device currently in communication with the user terminal and into the cell of a neighboring network interface device. The network interface device with which the user terminal is currently communicating is referred to as a serving network interface device, and the neighboring network interface device may be referred to as a target network interface device. When the signal strength of the serving network interface device declines as the user terminal moves away from the serving network interface device, it may be desirable for the user terminal and the network to continue the communication session through the target network interface device.

Before handover can take place, the user terminal may determine the signal strength of network interface devices nearby the serving network interface device to identify a suitable target network interface device. Generally, the serving network interface device may schedule certain time intervals during which the communication between the network and the user terminal is temporarily suspended to enable user terminal to measure the signals of the neighboring network interface devices. The measurements are referred to hereinafter as handover measurements. Based on the measurement results, the user terminal, the serving network interface device, or the network determines whether a handover should take place.

A conventional handover procedure is now explained with reference to FIG. 2, which illustrates handover measurements defined in the IEEE 802.16e standard.

In IEEE 802.16e, the network interface devices are base stations, and the user terminals are mobile stations. When a mobile station (MS) needs to measure the signals from neighboring base stations in preparation for a handover, communication with the network through the serving base station may be temporarily suspended. The measurement results may be reported back to the serving base station. Based on the measurement results, the network, the serving base station, or the user terminal determines whether a handover should take place.

The MS may initiate the handover measurements by sending a request to the serving base station. Alternatively, the serving base station may issue a command to the MS to initiate the measurements. The period from the initiation of the handover measurements to the completion of all the measurements and necessary reports thereof is referred to as a handover measurement period.

In the example shown in FIG. 2, the handover measurements are initiated by the base station. The serving base station is base station BS1, and the neighboring base stations include base stations BS2 and BS3. BS1 issues a command "MOB_SCN-RSP" to the MS to instruct the MS to measure signals from the neighboring base stations including BS2 and BS3. (201.) The MOB_SCN-RSP command includes several parameters: "start frame," "scanning interval," "interleaving interval," and "iteration." "Start frame" specifies when the MS should start the measurements, "scanning interval" specifies how much time the measurements should take, "iteration" specifies how many scanning intervals are allocated for the measurements, and "interleaving interval" specifies the time interval between two adjacent scanning intervals. Normal communication between the MS and BS1 may be temporarily suspended during the scanning interval and resumes during the interleaving interval. If measurement results need to be reported, the report is submitted during the interleaving interval. "Start frame," "scanning interval," and "interleaving interval" are all specified in numbers of radio frames. In an IEEE 802.16e network, the size of a frame may be 5 milliseconds. In the example shown in FIG. 2, the MS should start the measurement at the M-th frame after the MS receives the MOB_SCN-RSP command, measure the signals from BS2 and BS3 within a scanning interval of N frames, resume communication with BS1 for P frames, and may measure additional neighboring base stations during the additional scanning intervals.

During the scanning interval, the MS detects the synchronization signals from BS2, synchronizes to BS2, and measures the signals from BS2. (202.) Then the MS waits for the synchronization signals from BS3 and repeats the same process for BS3. (203.) Because the frames of the base stations are substantially aligned, the wait time between the measurements of BS2 and BS3 is approximately a full radio frame, e.g., 5 milliseconds.

If the signals from a neighboring base station are weak, the MS does not need to report the measurement results to BS1. If the signals from a neighboring base station are strong, then a handover is possible and the MS may need to submit a report to BS1. A threshold signal strength may be set by the network for determining when a report needs to be submitted. FIG. 2 assumes that the strength of signals from at least one of BS2 and BS3 exceed the threshold, and the MS needs to report back to BS1.

At the beginning of the interleaving interval, normal communication between the MS and the network through BS1 resumes, and the MS sends a request to BS1 for additional bandwidth for submitting the report. (204.) Upon receiving allocation of resource (205) for the submission of the report, the MS sends the measurement results to BS1 using the allocated resource. (206.) The report will be used by the network or BS1 to determine whether the communication should continue through BS2 or BS3. Alternatively, the MS may determine based on the measurement results if a handover is desired, and include in the report a request for handover. Again, because the frames of the base stations are aligned, and also because the mobile station needs to obtain allocation of resources for reporting, the wait time between the completion of the measurements and the report will be more than one frame, or 5 milliseconds.

If multiple scanning intervals have been allocated, the MS enters into another scanning interval at the end of the interleaving interval to measure signals from additional neighboring base stations.

The overhead information, such as the synchronization signals and the system information, consumes resources that would otherwise be available for normal data transmission. It is desirable to minimize overhead information, i.e., to minimize the control portion of radio frames. For example, so-called superframes were introduced in the IEEE 802.16m standard to reduce the control portion relative to the data portion in a frame. FIG. 3 illustrates the configuration of the superframe defined in the IEEE 802.16m standard.

The top portion of FIG. 3 shows the frame configuration viewed from a base station conforming to the IEEE 802.16m standard. The base station is also backward compatible with the IEEE 802.16e standard. The base station uses two interleaved frames. One frame has the same size as a frame defined in the IEEE 802.16e standard and is labeled "802.16e Frame." Another frame as defined in the IEEE 802.16m standard, referred to as and also labeled "Superframe," includes four 5 ms "802.16m frames." Each superframe begins with a superframe header (SFH) that may contain an 802.16m preamble and/or other system parameters. As shown in FIG. 3, the 802.16m frame and the 802.16e frame together make up the entire relevant time period, although separately they each comprise discontinuous time intervals. Also, the beginning of a superframe is offset with respect to an 802.16e frame.

Each of the 802.16m frame and the 802.16e frame includes a control portion and a data portion, respectively labeled "802.16m Control" or "802.16e Control" and "802.16m Data" or "802.16e Data." The control portion of the 802.16e frame contains overhead information for the operations of the base station under the IEEE 802.16e standard. The data portion of the 802.16e frame is used for data communication between the base station and mobile stations operating under the IEEE 802.16e standard. The control portion of the 802.16m frame contains overhead information for the operations of the base station under the IEEE 802.16m standard. The data portion of the 802.16m frame is used for data communication between the base station and mobile stations operating under the IEEE 802.16m standard.

The middle portion of FIG. 3, labeled "802.16e MS," illustrates the frame configuration viewed from a mobile station operating under the IEEE 802.16e standard. The bottom portion of FIG. 3, labeled "802.16m MS," illustrates the frame configuration viewed from the perspective of a mobile station operating under the IEEE 802.16m standard. These frame configurations should be understood by one skilled in the art and therefore are not explained in detail herein.

Compared to the IEEE 802.16e frame, where a preamble appears every 5 milliseconds, the preamble in a superframe appears only every 20 milliseconds. Consequently, the superframe configuration defined in the IEEE 802.16m standard requires much less overhead information as compared to the frame configuration defined in the IEEE 802.16e standard, and therefore results in improved system efficiency.

A problem arises, however, when a mobile station needs to perform handover measurements in preparation of a handover. A mobile station conforming to the IEEE 802.16e standard expects to wait for no more than 5 milliseconds between measurements of two neighboring base stations. However, a mobile conforming to the IEEE 802.16m standard may need to wait for up to 20 milliseconds between measurements of the neighboring base stations. As a result, handover measurements may take a significantly longer time in an IEEE 802.16m network than in an IEEE 802.16e network. The longer wait may force call drops if the mobile station cannot timely establish connection to a target base station. Similarly, the delay from the completion of the measurements and the report thereof will be significantly longer in IEEE 802.16m networks than in IEEE 802.16e networks. Such a long delay may result in an inaccurate report and wrong handover decisions.

SUMMARY OF THE INVENTION

Consistent with embodiments, there is provided a communication network that includes a plurality of network interface devices each covering a respective one of a plurality of cells. Each of the plurality of network interface devices communicates with communication entities in the respective cell using radio frames of the respective cell. The radio frames of a first one of the plurality of cells are shifted in time with respect to the radio frames of a second one of the plurality of cells.

Consistent with embodiments, there is also provided a communication network that includes a plurality of network interface devices each covering a respective one of a plurality of cells. Each of the plurality of network interface devices communicates with communication entities in the respective cell using radio frames of the respective cell. The radio frames of each of a first one and a second one of the plurality of cells include a first type of radio frame and a second type of radio frame. The first type of radio frame of the first one of the plurality of cells is substantially aligned in time with the first type of radio frame of the second one of the plurality of cells. The second type of radio frame of the first one of the plurality of cells is shifted in time with respect to the second type of radio frame of the second one of the plurality of cells.

Consistent with embodiments, there is also provided a method of a communication network. The method includes providing a plurality of cells each covered by a respective one of a plurality of network interface devices, providing first radio frames for a first one of the plurality of cells, providing second radio frames for a second one of the plurality of cells, and providing the first and second radio frames to be shifted in time with respect to each other.

Consistent with embodiments, there is also provided a method of a mobile station in a wireless communication network. The wireless communication network includes a plurality of network interface devices each covering a respective cell and each communicating data in respective radio frames, wherein each radio frame includes a control portion for broadcast signals and a data portion for user data, wherein the radio frames of a first one and a second one of the plurality of network interface devices are shifted in time with respect to each other. The method includes communicating with the wireless communication network through the first one of the plurality of network interface devices, and measuring signals or reading information in the control portion of the radio frames of the second one of the plurality of network interface devices.

Consistent with embodiments, there is also provided a communication network that includes a plurality of network interface devices each covering a respective one of a plurality of cells. At least one of the plurality of network interface devices communicates with communication entities in the respective cell using one or more frequency carriers, each frequency carrier associated with respective radio frames. The radio frames of a first one of the one or more frequency carriers of at least one of the plurality of network interface devices are shifted in time with respect to the radio frames of a second one of the one or more frequency carriers of the at least one of the plurality of cells.

Additional features and advantages of the invention will be set forth in part in the description which follows, and in part will be apparent from that description, or may be learned by practice of the invention. The features and advantages of the invention will be realized and attained by means of the elements and combinations particularly pointed out in the appended claims.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of this specification, illustrate embodiments of the invention and, together with the description, serve to explain features, advantages, and principles of the invention.

In the drawings,

FIGS. 4(a)-4(c) illustrate staggered frame configurations consistent with exemplary embodiments;

FIGS. 5(a)-5(c) show exemplary implementations of staggered frame configurations consistent with exemplary embodiments;

DESCRIPTION OF THE EMBODIMENTS

Figure 1:
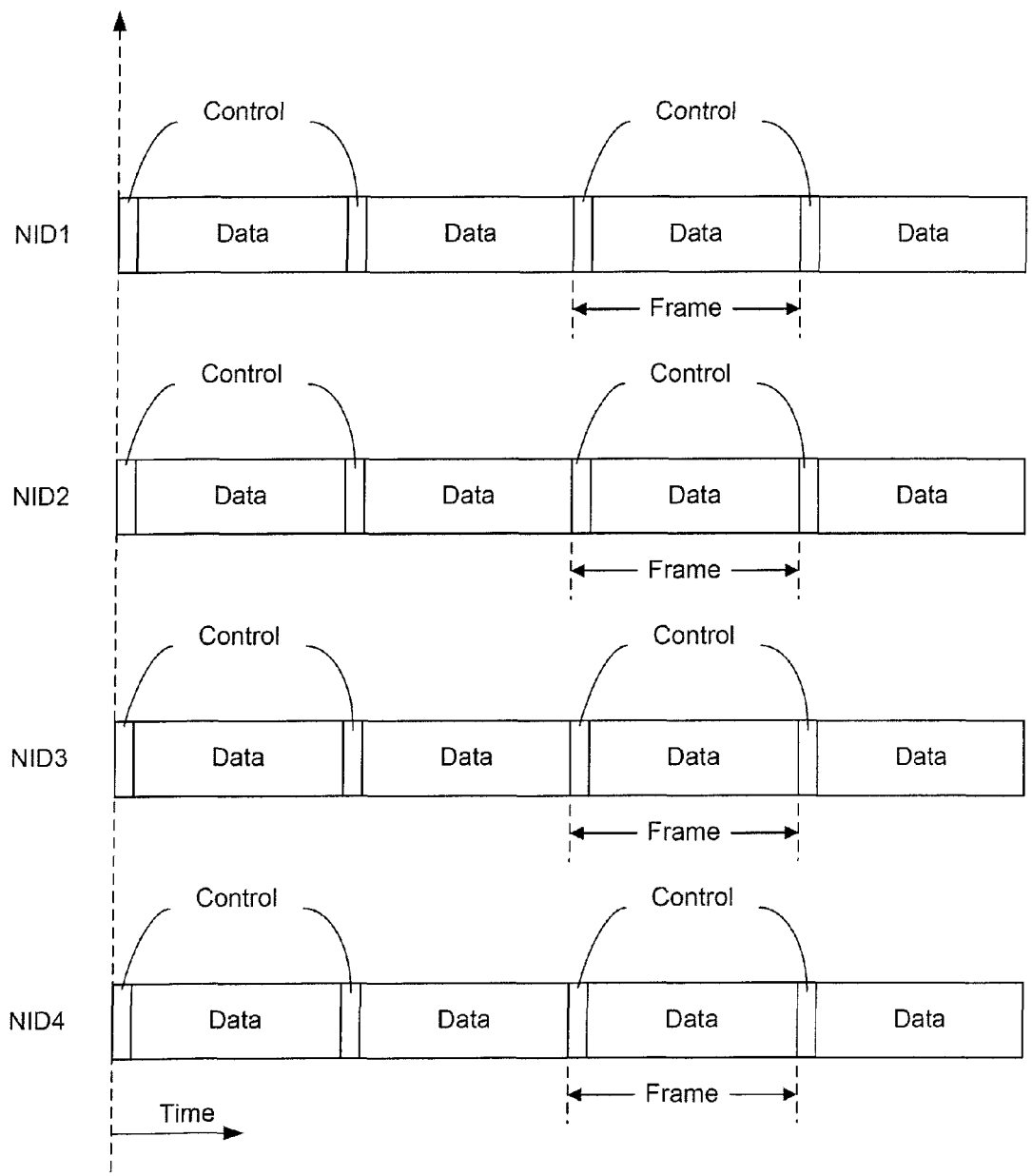
FIG. 1 illustrates a conventional frame configuration in a wireless network.
Figure 2:
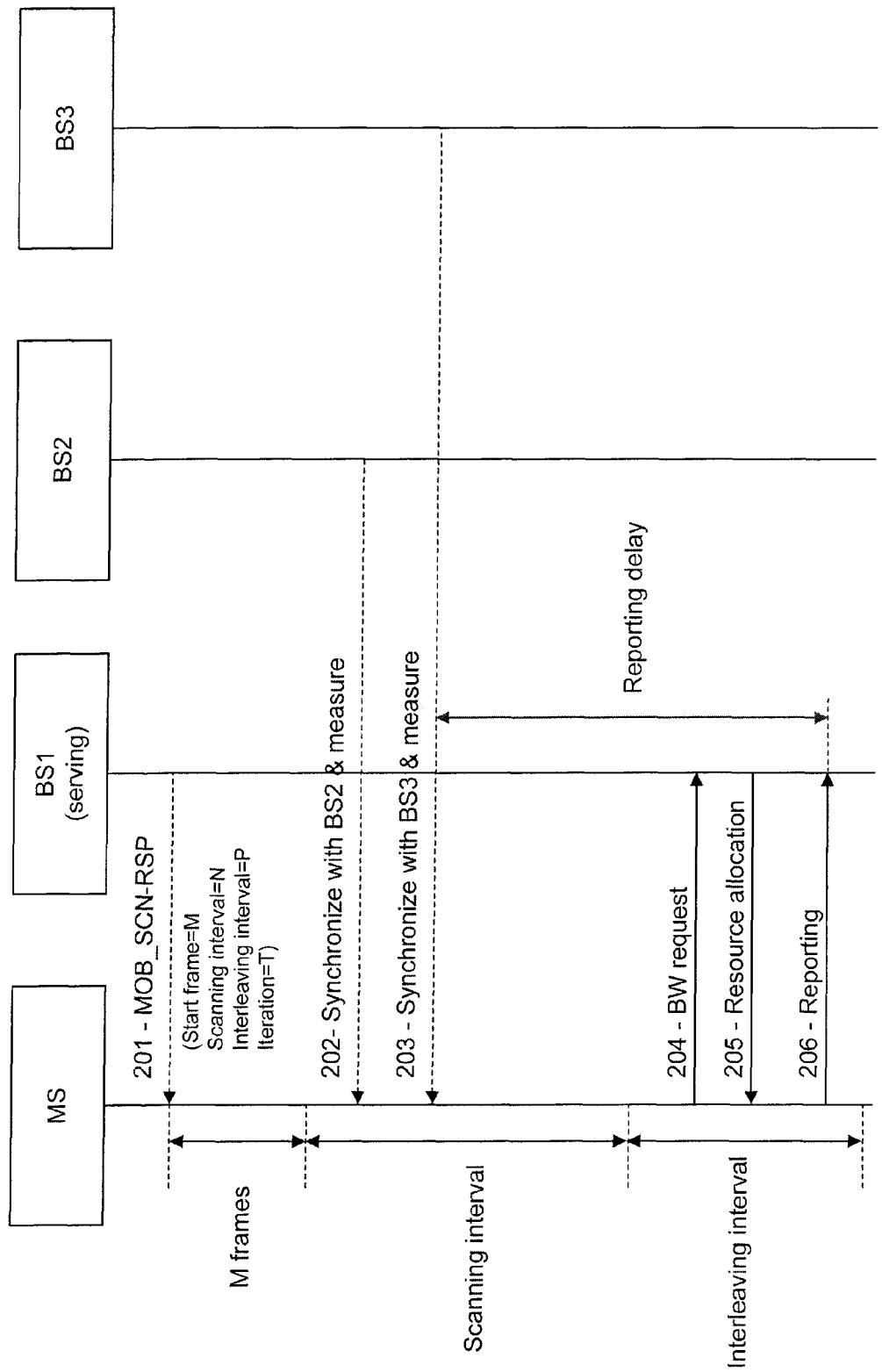
FIG. 2 illustrates a conventional handover measurement procedure defined in the IEEE 802.16e standard.

Reference will now be made in detail to the present embodiments of the invention, examples of which are illustrated in the accompanying drawings. Wherever possible, the same reference numbers will be used throughout the drawings to refer to the same or like parts.

Consistent with exemplary embodiments, there are provided methods and apparatuses for communications using staggered radio frames in a wireless communication system.

A wireless network or system generally includes multiple network interface devices such as base stations, relay stations, femtocell base stations, home base stations, etc. Each network interface device covers a particular area called a cell and communicates with user terminals located within the cell. Consistent with exemplary embodiments, a wireless network may adopt a staggered frame configuration across multiple cells. More particularly, devices operating within a cell may have the same frame configuration, but devices operating in different cells may have frames offset from one another. FIG. 4(a) illustrates a staggered frame configuration for a wireless network consistent with exemplary embodiments, where four network interface devices are shown. However, the number of network interface devices in the network may vary.

In an exemplary wireless network, four network interface devices NID1, NID2, NID3, NID4 respectively cover four cells. These four cells may or may not be adjacent to one another, and one cell may overlap or cover another cell. For example, a regular base station may cover a cell that includes one or more femtocells covered by one or more base stations. Each cell uses a common frame configuration. In other words, the radio frames used by each of the four network interface devices and the user terminals within the respective cell have the same size, structure, and timing. However, between cells, the frames have different timing, although they may have the same size and same structure. In particular, the frames in one cell may be shifted with respect to the frames in another cell. More particularly as shown in FIG. 4(a), the frames used in the cell of network interface device NID2 are delayed with respect to the frames used in the cell of network interface device NID1. The frames used in the cell of network interface device NID3 are further delayed with respect to the frames used in the cell of network interface device NID2. The frames used in the cell of network interface device NID4 are further delayed with respect to the frames used in the cell of network interface device NID3. Thus, the network operates on a series of staggered radio frames.

FIG. 4(a) also shows that each radio frame may include a control portion and a data portion. The control portion is used for transmitting overhead information such as synchronization signals, system information, and resource allocation information. The data portion is used for transmitting user data. The network interface devices may broadcast the overhead information in the control portion.

In one aspect, the frames in multiple cells are evenly staggered with a uniform shift between the frames in adjacent cells. For example, the shift between the frames associated with NID1 and NID2 is the same as that between NID2 and NID3, and so on. In another aspect, the frames of the network interface devices are not evenly staggered such that the shift between the frames of cells varies across the network.

Consistent with embodiments, the shifts between the frames of cells allow a user terminal sufficient time to complete the handover measurements of one network interface device and start the handover measurements of another network interface device. Factors that affect the determination of the shifts may include the distance between the network interface devices, whether the network interface devices are operating in the same frequency bands, the time needed for a user terminal to switch its operation from the frequency of one network interface device to that of another, the time needed for a user terminal to complete the measurements of one network interface device after the user terminal detects the signals from that network interface device, and the time needed for a user terminal to receive essential system parameters from that network interface device, etc.

Consistent with exemplary embodiments, there are also provided staggered frame configurations in which part of the overhead information is transmitted once every frame, but another part of the overhead information is transmitted more than once every frame.

Figure 4B:
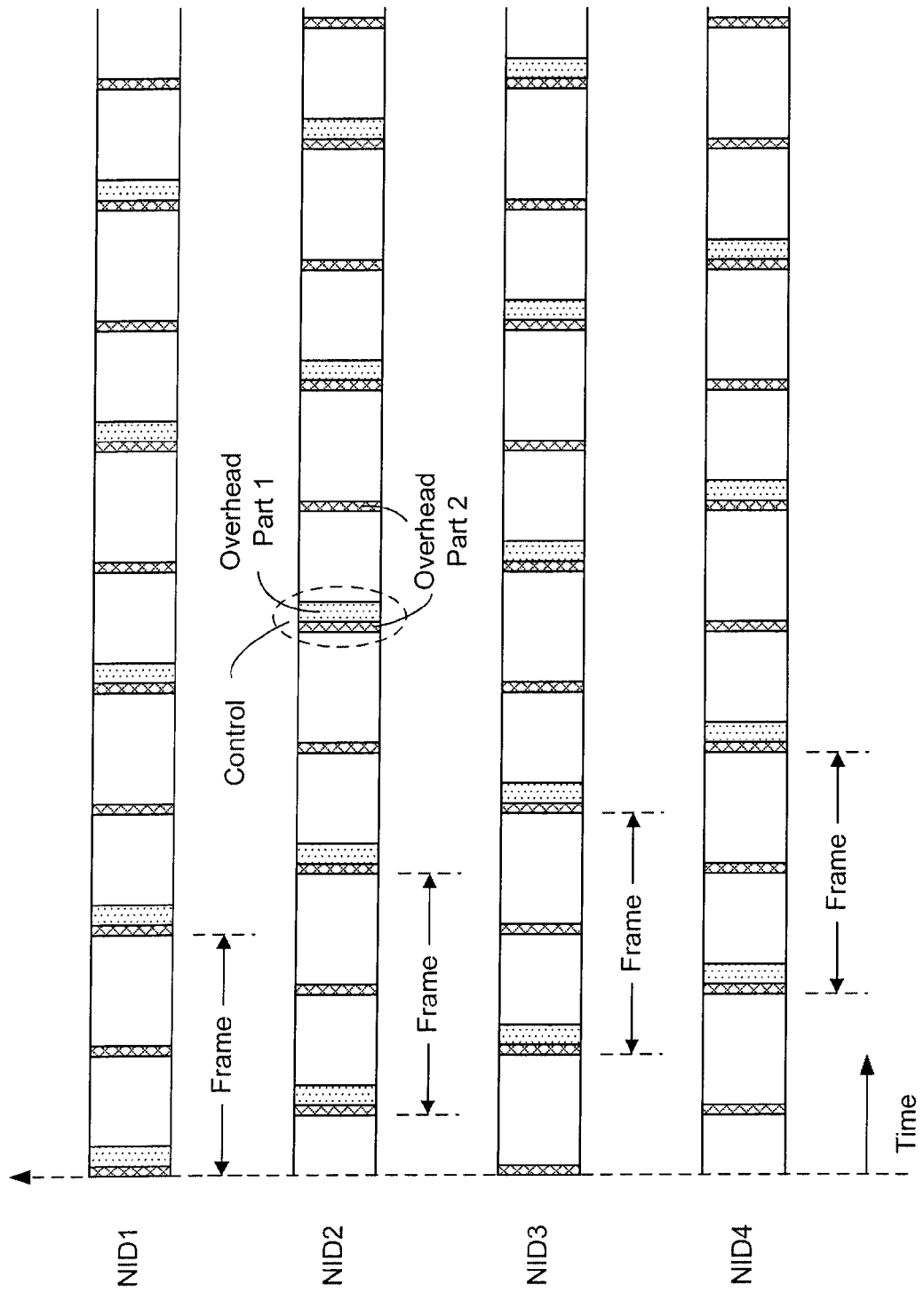

As an example, FIG. 4(b) shows a staggered frame configuration consistent with exemplary embodiments. As shown in FIG. 4(b), the control portion of each frame contains two parts of overhead information, respectively labeled "Overhead Part 1" and "Overhead Part 2." Overhead Part 1 information is transmitted only once every frame and in the control portion. Overhead Part 2 information, however, is transmitted twice every frame. Depending on the particular application, certain overhead information can be repeated during a radio frame as Overhead Part 2 information, while other overhead information only needs to be transmitted once in the control portion as Overhead Part 1 information. For example, synchronization signals can be repeated during the radio frame as Overhead Part 2 information, and other system information can be transmitted as Overhead Part 1 information only once a frame in the control portion.

Figure 4C:
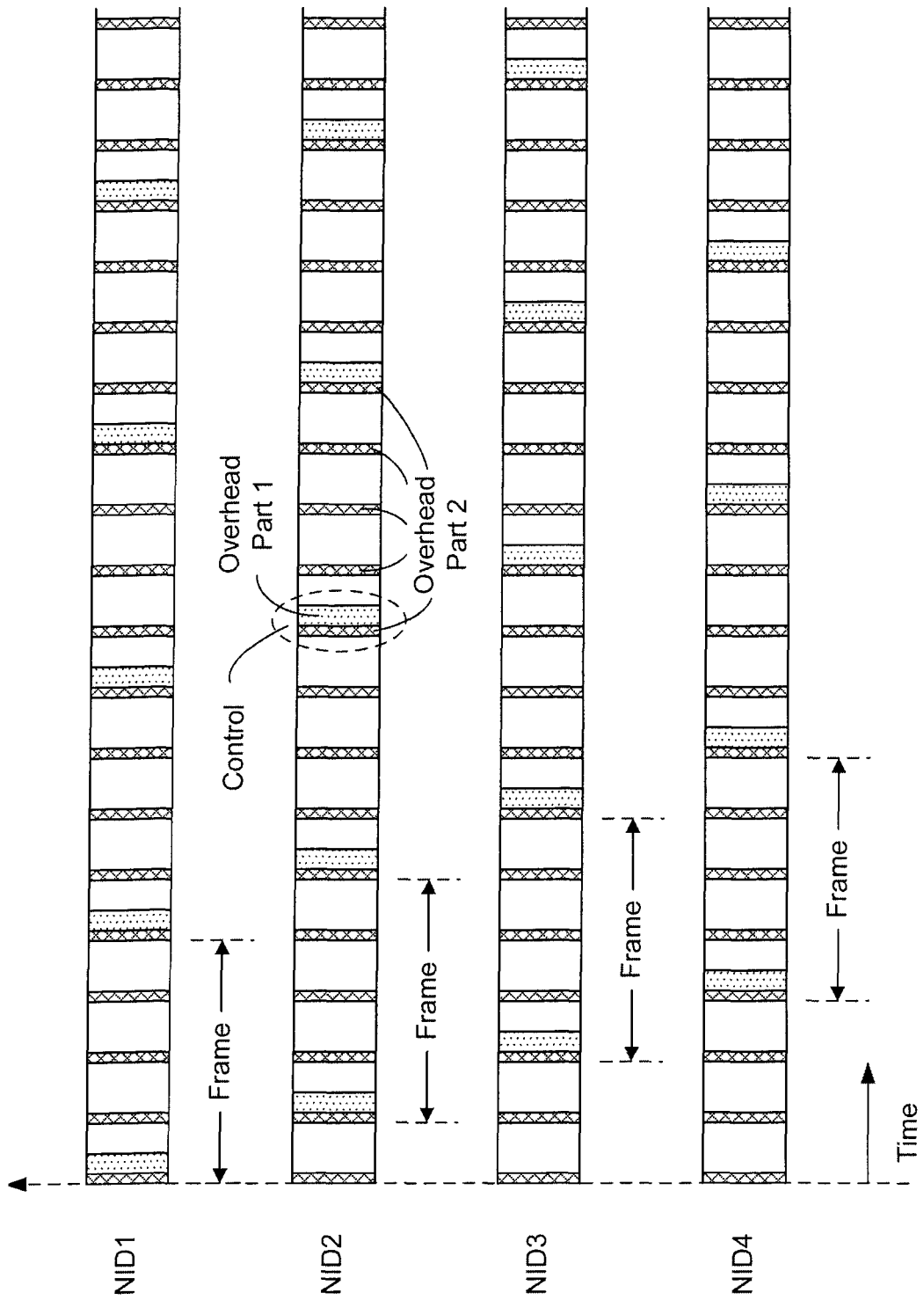

FIG. 4(c) further shows a staggered frame configuration consistent with exemplary embodiments, in which Overhead Part 2 information is transmitted four times a frame. As shown in FIG. 4(c), transmissions of Overhead Part 2 are substantially aligned with one another among the network interface devices, while transmissions of Overhead Part 1 are shifted in time with one another.

Figure 5A:
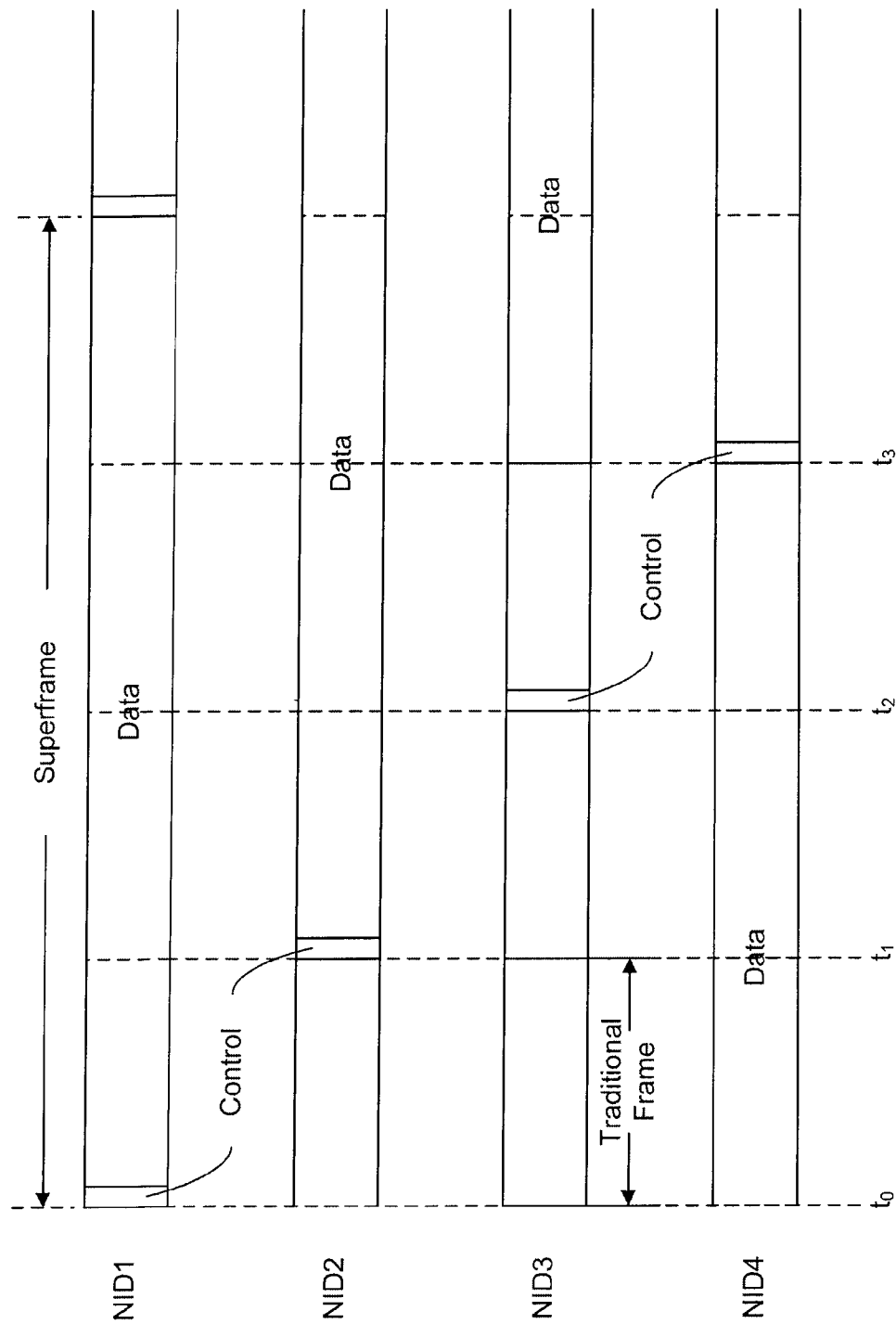

FIG. 5(a) shows a staggered frame construction with an increased frame size, such as the superframe introduced in the IEEE 802.16m standard. Four network interface devices, NID1, NID2, NID3, NID4, covering four respective cells, are shown in FIG. 5(a). Each cell uses a superframe that is several times the size of a traditional radio frame in, e.g., the IEEE 802.16e frame. A superframe used in the cell of NID1 starts at time $t_0$, a superframe used in the cell of NID2 starts at time $t_1$, a superframe used in the cell of NID3 starts at time $t_2$, and a superframe used in the cell of NID4 starts at time $t_3$. Times $t_0$, $t_1$, $t_2$, and $t_3$ are spaced apart. For example, the time difference between the superframes in the cells of two network interface devices allows a user terminal sufficient time to complete handover measurements of one of the cells and start the handover measurements of the other. In one aspect, $t_0$, $t_1$, $t_2$, and $t_3$ are equally spaced apart. Assuming the traditional radio frames are 5 milliseconds long, then the difference between $t_0$ and $t_1$, the difference between $t_1$ and $t_2$, and the difference between $t_2$ and $t_3$ are all 5 milliseconds. In another aspect, $t_0$, $t_1$, $t_2$, and $t_3$ are not equally spaced apart. With the staggered frame configuration of FIG. 5(a), when a user terminal performs handover measurements during a scanning interval, the wait time between measurements of two network interface devices might be on average shorter than the size of a superframe, e.g., 20 milliseconds for a superframe defined in the IEEE 802.16m standard.

Figure 5C:
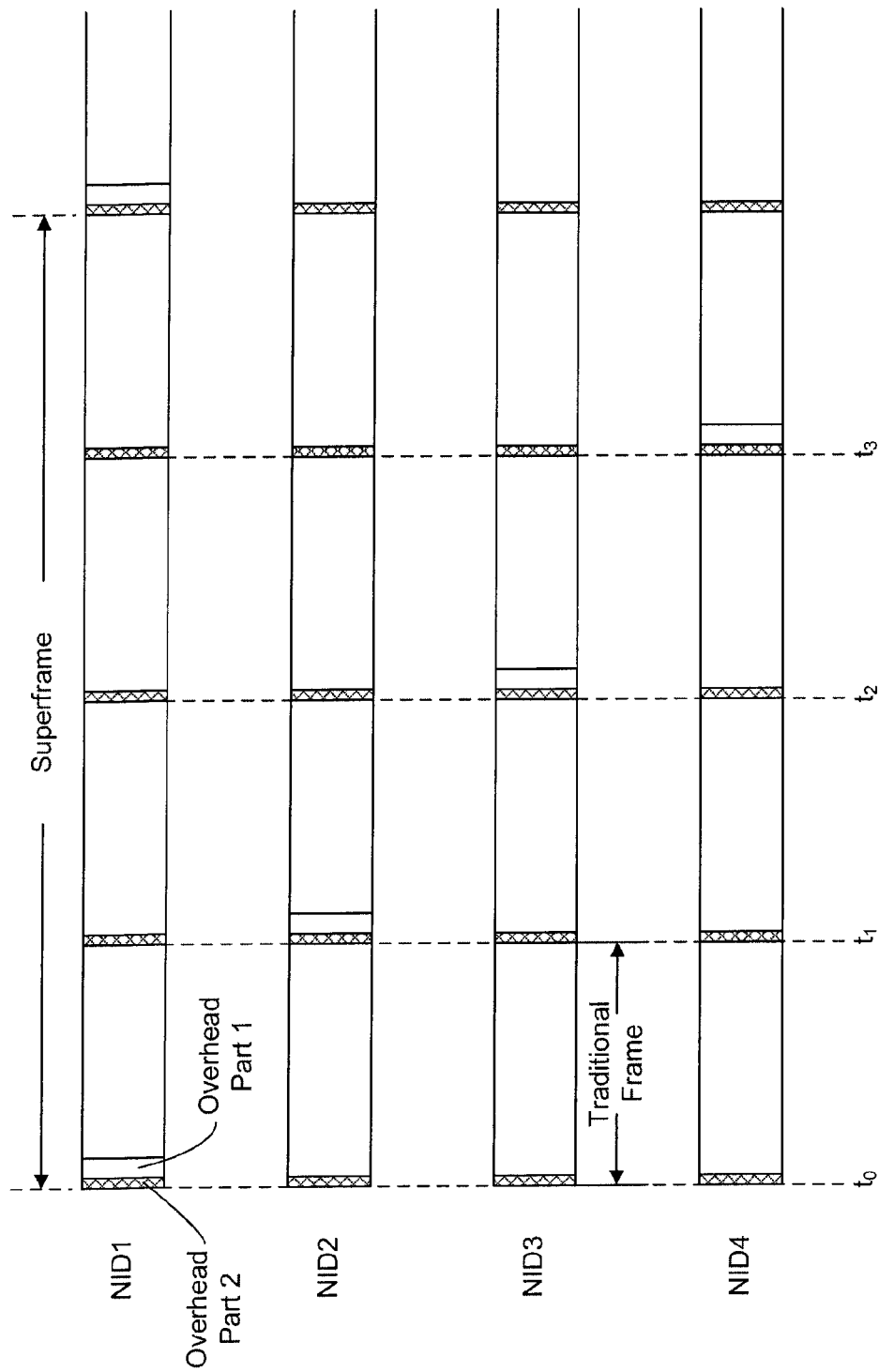

As shown in FIG. 5(a), each superframe includes a control portion and a data portion. In one aspect, the network interface devices may transmit synchronization signals in the control portion of each superframe. In another aspect, the network interface devices may transmit system information in the control portion of each superframe. The network interface devices may also transmit resource information in the control portion. The control portion may be transmitted in a single portion of a superframe, as shown in FIG. 5(a). Alternatively, the control portion may be distributed in several parts through a superframe, as shown in FIGS. 5(b) and 5(c).

As another example, FIG. 5(b) shows a staggered frame construction with an increased frame size, in which part of the overhead information, i.e., Overhead Part 2, is transmitted twice during each superframe. FIG. 5(c) further shows a staggered frame construction with an increased frame size, in which part of the overhead information, i.e., Overhead Part 2, is transmitted four times during each superframe.

FIGS. 5(*a*)-5(*c*) further show that the radio frames are aligned with each other between the network interface devices, while the superframes of the network interface devices are shifted in time with each other.

Figure 3:
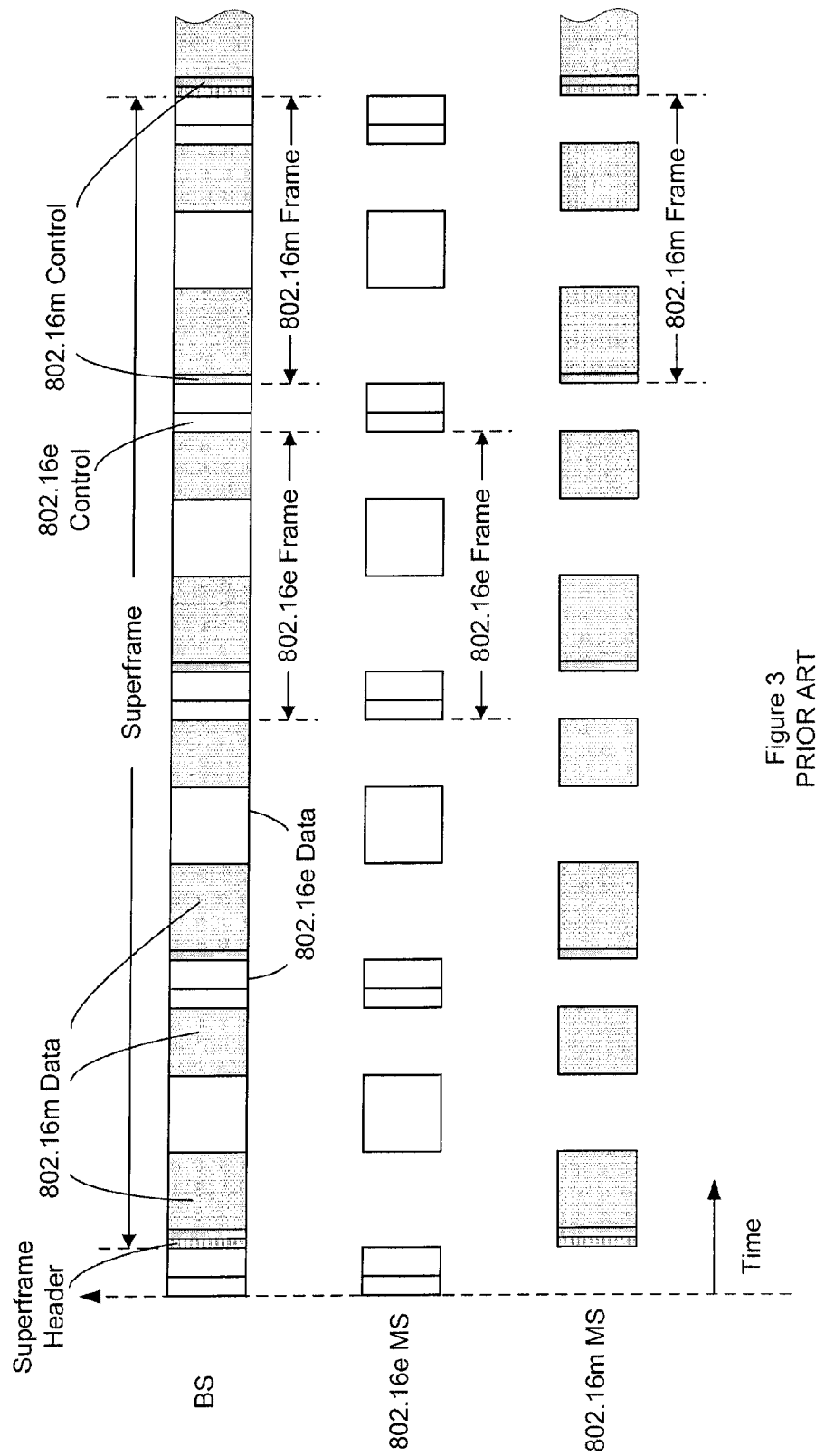
FIG. 3 illustrates a frame configuration defined in the IEEE 802.16m standard.
Figure 6:
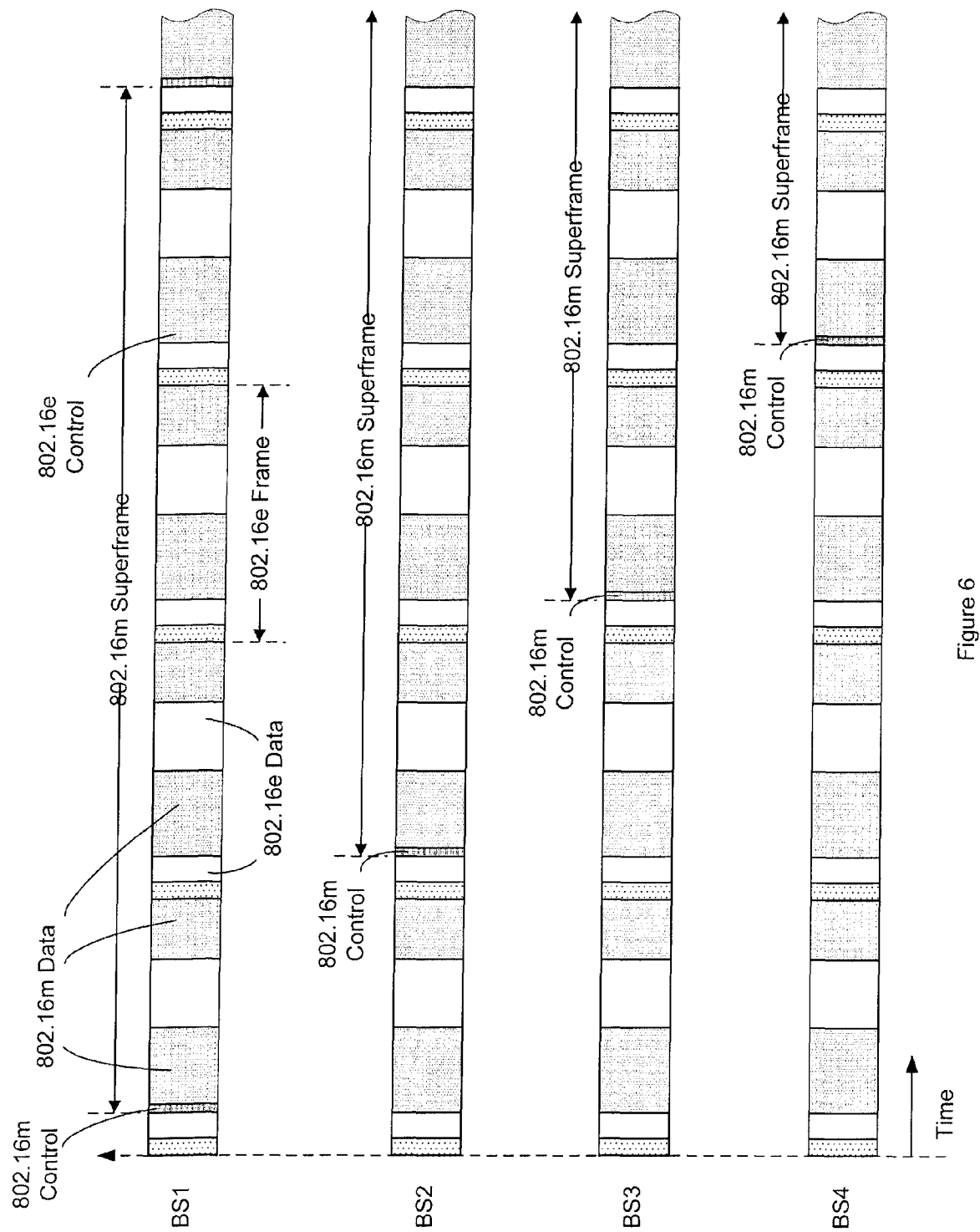
FIG. 6 illustrates an exemplary implementation of a staggered frame configuration consistent with exemplary embodiments.

Consistent with exemplary embodiments, the staggered frame configurations of FIGS. 5(*a*)-5(*c*) may be used in a network, in which multiple systems coexist. For example, FIG. 6 shows an implementation of the staggered frame configuration of FIG. 5(*a*) in a network that includes an IEEE 802.16m system and also an IEEE 802.16e system. Four base stations, BS1, BS2, BS3, and BS4, covering four respective cells, are shown. Each cell uses two different frames interleaved with each other. A regular frame, labeled "802.16e Frame," is defined in the IEEE 802.16e standard. A superframe, labeled "802.16m Superframe," is defined in the IEEE 802.16m standard. The interleaving of the 802.16e and 802.16m superframes was discussed above with reference to FIG. 3.

The 802.16e frames in the cells of all four base stations are shown in FIG. 6 to be substantially aligned in time with one another. However, the superframes of the four cells are staggered from one another. In particular, the superframe of BS2 is delayed with respect to that of BS1, and the superframe of BS3 is further delayed with respect to that of BS2, etc. Thus, the control portions of the superframes of the four base stations are transmitted at different times.

Although FIG. 6 shows the 802.16e frames are all aligned to one another between the base stations, it should now be understood by one skilled in the art that such 802.16e frames can also be staggered.

In addition, FIG. 6 shows a system that supports both 802.16e and 802.16m operations. However, it is to be understood that staggered frame configurations can be applied to systems supporting a variety of communication protocols. For example, a system may support both 802.16m and Wireless MAN-OFDMA operations, and a staggered frame configuration consistent with embodiments herein may be applied to either or both of the 802.16m and Wireless MAN-OFDMA aspects of the system.

Although FIGS. 4(*a*)-4(*c*), 5(*a*)-5(*c*), and 6 only show the frame configurations of four network interface devices or cells, a network generally includes more cells. In one aspect, a network with more cells may adopt a more finely staggered frame configuration. In other words, the time shift between the frames of different cells can be smaller to provide more versions of staggered radio frames, provided that the time shift is sufficient for a user terminal to complete the handover measurements of one network interface device and start the handover measurements of another network interface device without waiting for another frame.

In another aspect, the cells in a network can be divided into several groups, with the cells in each group use the same frame timing. For example, a network may divide its cells in four groups and adopt any of the frame configurations of FIGS. 4(*a*)-4(*c*), 5(*a*)-5(*c*), and 6, where a first group of cells use the frame of NID1 or BS1, and a second group of cells use the frame of NID2 or BS2, etc. If the frames are more finely staggered to provide more versions of staggered frames, then the cells in the network can be divided into more than four groups, each using one of the staggered frames.

Figure 7:
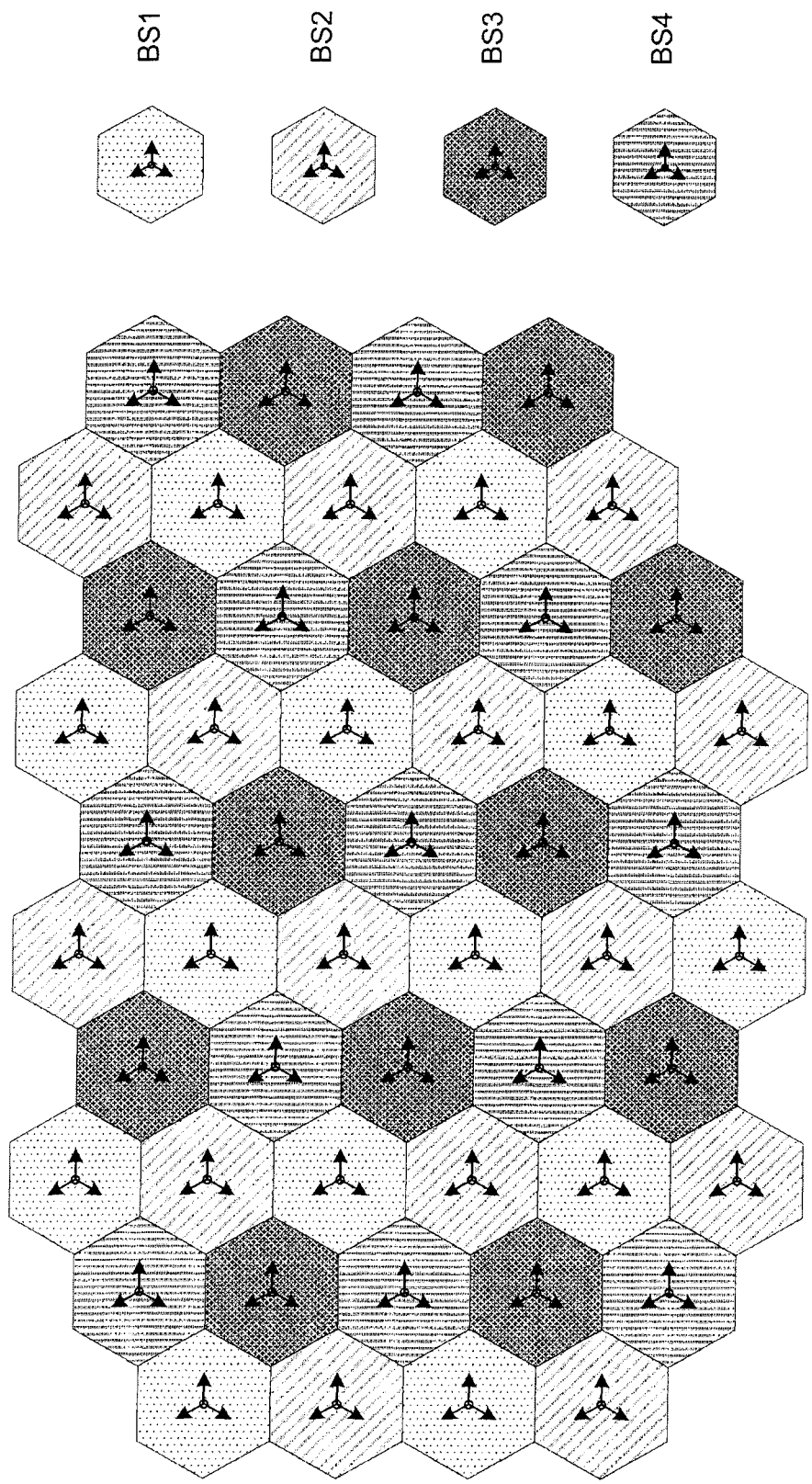
FIG. 7 illustrates another exemplary implementation of a staggered frame configuration consistent with exemplary embodiments.

Because handover generally takes place only between adjacent or overlapping cells and/or femtocells, a user terminal in preparation of a handover only needs to measure signals and/or read system information from neighboring network interface devices of the serving network interface device. Thus, not every cell needs to have a frame timing different than that of every other cell. Rather, the same frame configuration can be used in cells sufficiently separated from one another. FIG. 7 illustrates an exemplary implementation of an exemplary embodiment where only four versions of staggered frames are used in a network with more than four cells.

Referring to FIG. 7, each hexagon represents a cell covered by a network interface device such as a base station. The network interface devices are divided into four groups, each represented by a distinct pattern in the hexagon. In one aspect, the four groups each use one of the four staggered frames, such as those shown in FIGS. 4(*a*)-4(*c*), 5(*a*)-5(*c*), and 6. For example, the cells represented by the dotted hexagons may use the frame configuration of NID1 in FIG. 4(*a*), and the cells represented by the hexagons with slanted lines may use the frame configuration of NID2 in FIG. 4(*a*), etc.

With the configuration shown in FIG. 7, each cell uses one of the four staggered frames, and its six neighboring cells respectively use the three other staggered frames. Thus, a user terminal within a cell can perform handover measurements of three of the six neighboring cells in approximately one radio frame, and complete the measurements of the other three in a second radio frame. In contrast, with the conventional frame configuration, in which the radio frames of all network interface devices are aligned with one another, measuring signals from all six neighboring cells may take up to six radio frames.

One skilled in the art should now appreciate that a serving network interface device can schedule more efficient handover measurements in a network with a staggered frame configuration. For example, the scanning interval can be shortened as compared to that in conventional systems, and/or the iteration may be reduced. Additionally, depending on the time required for a user terminal to measure the signals and/or read system information from one network interface device, the serving network interface device may instruct the user terminal to measure signals and/or read system information from multiple network interface devices in any particular order that the serving network interface device sees to be efficient.

Although FIG. 7 shows the cells with hexagons, it is to be understood that the cells in actual networks generally have odd shapes rather than perfect hexagons. The actual shape depends on the particular environment in which a network interface device is located. It is also to be understood that the cells in actual networks do not necessarily have the same size. For example, a cell in a rural area may be larger than a cell in an urban area, two cells may overlap with each other, and/or one cell may cover another cell. Regardless of the shape and size of the cells, the exemplary embodiments described herein may be applied in such systems to improve several aspects, as discussed above.

Figure 8B:
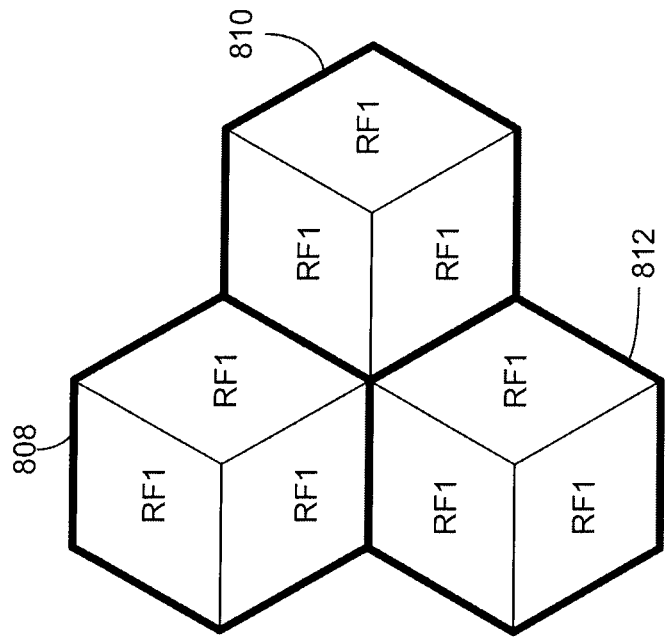
FIGS. 8(a) and 8(b) show different frequency reuse schemes.

Referring again to FIG. 7, within each hexagon, three arrows represent three sectors. The same frequency may be used in all three sectors in a cell. Alternatively, different frequencies may be allocated for the three sectors. FIGS. 8(*a*) and 8(*b*) show different frequency reuse schemes. In FIGS. 8(*a*) and 8(*b*), "RF1," "RF2," and "RF3" represent three different frequencies. Thus, in FIG. 8(*a*), the three sectors within each of cells 802, 804, and 806, wherein each sector is represented by a parallelogram, have different frequencies, but adjacent cells have the same frequency allocations for the corresponding sectors. In FIG. 8(*b*), not only all of cells 808, 810, and 812 have the same frequency, but the three sectors within each cell have the same frequency.

Figure 8A:
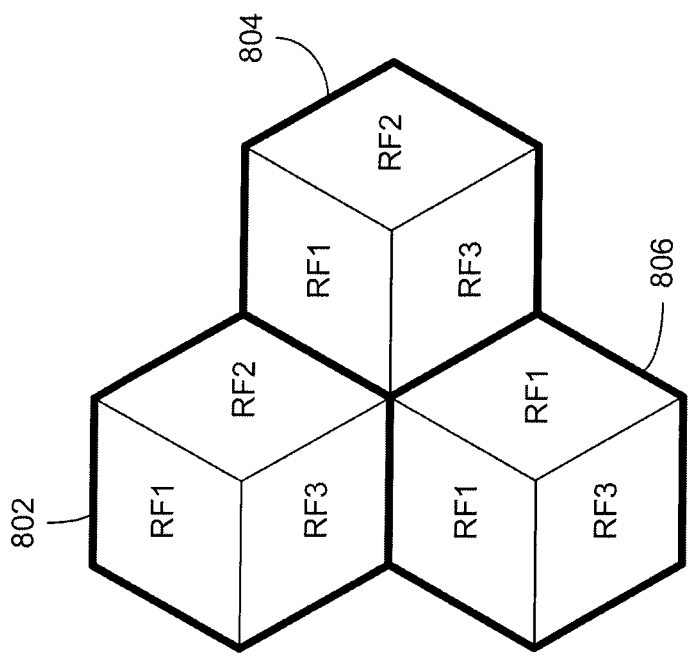

Consistent with exemplary embodiments, the staggered frame configuration shown in FIG. 7 can be applied to a network with the frequency reuse scheme shown in FIG. 8(a) with each cell in FIG. 8(a) considered as a cell in FIG. 7. Also, the staggered frame configuration shown in FIG. 7 can be applied to a network with the frequency reuse scheme shown in FIG. 8(b) with each sector of a cell in FIG. 8(b) considered as a cell in FIG. 7. In other words, each sector of a cell uses a version of the staggered frames different than its neighboring sectors. The application of the frame configuration to networks with the frequency reuse scheme of FIG. 8(a) or FIG. 8(b) should now be understood by one skilled in the art and is therefore not explained in further detail herein.

It is to be understood, however, that a cell does not always include three sectors, and one skilled in the art should appreciate that implementation of the exemplary embodiments can be adapted to any system where a cell includes more or fewer sectors.

Additionally, each cell or each sector may use more than one radio frequency (RF) carrier. The RF carriers may have the same or different bandwidths (e.g., 5 MHz, 10 MHz, 20 MHz, or 40 MHz, etc.), be contiguous or non-contiguous in frequency, or belong to different frequency bands. The RF carriers may also be used in any duplexing mode (e.g., frequency division duplex (FDD) or time division duplex (TDD)) or be used as a mixture of bidirectional and broadcast only carriers.

A staggered frame configuration consistent with embodiments herein may be applied to networks with multiple frequency carriers per cell or sector such that the radio frames for different frequency carriers are staggered with respect to one another. For example, a frequency carrier of a network interface device may use a version of the staggered frames different than another frequency carrier of the same network interface device. One skilled in the art should now understand such configurations and therefore no detailed discussion is provided here.

Although the above descriptions of the exemplary embodiments refer to the IEEE 802.16e and 802.16m standards as examples, it is to be understood that the present invention is not limited thereto. For example, the IEEE 802.16e standard defines a time division duplex (TDD) scheme in which a radio frame includes different subframes for uplink and downlink transmissions. However, a system with a frequency division duplex (FDD) scheme, in which uplink and downlink transmissions are carried on different frequencies, can also adopt the staggered frame configurations consistent with the exemplary embodiments. For example, such systems as Universal Mobile Telecommunication System (UMTS), High-Speed Uplink Packet Access (HSUPA), Evolved High-Speed Packet Access (HSPA Evolution), Long Term Evolution (LTE), LTE Advanced, etc., as promulgated by the 3rd Generation Partnership Project (3GPP™), can also adopt the staggered frame configurations consistent with the exemplary embodiments described herein.

It will be apparent to those skilled in the art that various modifications and variations can be made in the disclosed embodiments without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A communication network, comprising:
  a plurality of network interface devices each covering a respective one of a plurality of cells, wherein
  each of the plurality of network interface devices communicates with communication entities in the respective cell using radio frames of the respective cell,
  each radio frame includes a control portion for broadcast signals and a data portion for user data,
  a first portion of the broadcast signals is transmitted once each radio frame, and a second portion of the broadcast signals is transmitted more than once each radio frame,
  the transmission of the second portion of the broadcast signals in the radio frames of a first one of the plurality of cells is aligned with the transmission of the second portion of the broadcast signals in the radio frames of a second one of the plurality of cells, and
  the radio frames of the first one of the plurality of cells are shifted in time with respect to the radio frames of the second one of the plurality of cells.

2. The communication network of claim 1, wherein the radio frames of the first one of the plurality of cells have the same size as the radio frames of the second one of the plurality of cells.

3. The communication network of claim 1, wherein the transmission of the first portion of the broadcast signals in the radio frames of the first one of the plurality of cells is shifted in time with respect to the transmission of the first portion of the broadcast signals in the radio frames of the second one of the plurality of cells.

4. The communication network of claim 1, wherein the first and second ones of the plurality of cells overlap with each other.

5. The communication network of claim 1,
  wherein the first one of the plurality of cells covers the second one of the plurality of cells.

6. The communication network of claim 1, wherein the shift in time between the radio frames of the first and second ones of the plurality of cells is different from a shift in time between the radio frames of the second one of the plurality of cells and a third one of the plurality of cells.

7. A communication network, comprising:
  a plurality of network interface devices each covering a respective one of a plurality of cells, wherein
  each of the plurality of network interface devices communicates with communication entities in the respective cell using radio frames of the respective cell,
  each of the radio frames includes a control portion for broadcast signals and a data portion for user data,
  the transmission of a portion of the broadcast signals in the radio frames of a first one of the plurality of cells is aligned with the transmission of the portion of the broadcast signals in the radio frames of a second one of the plurality of cells,
  the radio frames of each of the first one and the second one of the plurality of cells include a first type of radio frame and a second type of radio frame,
  the first type of radio frame of the first one of the plurality of cells is aligned in time with the first type of radio frame of the second one of the plurality of cells, and
  the second type of radio frame of the first one of the plurality of cells is shifted in time with respect to the second type of radio frame of the second one of the plurality of cells.

8. The communication network of claim 7, wherein the transmission of a first portion of the broadcast signals in the radio frames of the first one of the plurality of cells is shifted in time with respect to the transmission of the first portion of the broadcast signals in the radio frames of the second one of the plurality of cells.

9. A method of a communication network, comprising:
providing a plurality of cells each covered by a respective one of a plurality of network interface devices;
providing first radio frames for a first one of the plurality of cells;
providing second radio frames for a second one of the plurality of cells; and
providing the first and second radio frames to be shifted in time with respect to each other, wherein
each of the first and second radio frames includes a control portion for broadcast signals and a data portion for user data, and
the transmission of a portion of the broadcast signals in the radio frames of the first one of the plurality of cells is aligned with the transmission of the portion of the broadcast signals in the radio frames of the second one of the plurality of cells.

10. The method of claim 9, wherein the first one of the plurality of cells includes three sectors, the method further comprising:
providing third and fourth radio frames for the first one of the plurality of cells;
communicating data, by a corresponding one of the plurality of network interface devices, with communication entities in the three sectors of the first one of the plurality of cells, in respective ones of the first, third, and fourth radio frames; and
providing the first, third, and fourth radio frames to be shifted in time with respect to one another.

11. The method of claim 9, further comprising:
grouping the plurality of cells;
providing radio frames aligned in time to one another for the cells within each group; and
providing radio frames shifted in time with one another for the cells from different groups.

12. The method of claim 9, further comprising:
providing third radio frames for the first one of the plurality of cells;
providing fourth radio frames for the second one of the plurality of cells; and
providing the third and fourth radio frames to have a different frame size than the first and second radio frames.

13. The method of claim 12, further comprising:
providing the third and fourth radio frames to be aligned in time with each other.

14. A method of a mobile station in a wireless communication network, wherein the wireless communication network includes a plurality of network interface devices each covering a respective cell and each communicating data in respective radio frames, wherein each radio frame includes a control portion for broadcast signals and a data portion for user data, wherein the radio frames of a first one and a second one of the plurality of network interface devices are shifted in time with respect to each other, and the transmission of a portion of the broadcast signals in the radio frames of the first one of the plurality of network interface devices is aligned with the transmission of the portion of the broadcast signals in the radio frames of the second one of the plurality of network interface devices, the method comprising:
communicating with the wireless communication network through the first one of the plurality of network interface devices; and
measuring signals or reading information in the control portion of the radio frames of the second one of the plurality of network interface devices.

15. The method of claim 14, further comprising:
temporarily suspending the communication through the first one of the plurality of network interface devices during the measuring or reading of the information in the control portion of the radio frames of the second one of the plurality of network interface devices; and
resuming the communication through the first one of the plurality of network interface devices after the measuring of the signals or the reading of the information in the control portion of the radio frames of the second one of the plurality of network interface devices.

16. The method of claim 14, further comprising measuring signals or reading information in the control portion of the radio frames of additional ones of the plurality of network interface devices.

17. The method of claim 14, further comprising reporting results of the measuring of the signals or the reading of the information in the control portion of the radio frames of the second one of the plurality of network interface devices.

18. The method of claim 14, further comprising continuing the communication through the second one of the plurality of network interface devices.

19. A communication network, comprising:
a plurality of network interface devices each covering a respective one of a plurality of cells, wherein
at least one of the plurality of network interface devices communicates with communication entities in the respective cell using one or more frequency carriers, each frequency carrier associated with respective radio frames,
each of the radio frames includes a control portion for broadcast signals and a data portion for user data,
the transmission of a portion of the broadcast signals in the radio frames of a first one of the plurality of cells is aligned with the transmission of the portion of the broadcast signals in the radio frames of a second one of the plurality of cells, and
the radio frames of a first one of the one or more frequency carriers of the at least one of the plurality of network interface devices are shifted in time with respect to the radio frames of a second one of the one or more frequency carriers of the at least one of the plurality of network interface devices.

20. The communication network of claim 19, wherein at least a second one of the plurality of network interface devices communicates with the communication entities in the respective cell using one or more frequency carriers, each frequency carrier associated with respective radio frames, and the radio frames of the first one of the one or more frequency carriers of the at least one of the plurality of network interface devices are shifted in time with respect to the radio frames of a first one of the one or more frequency carriers of the at least second one of the plurality of network interface devices.

21. A communication network, comprising:
a plurality of network interface devices each covering a respective one of a plurality of cells, wherein
each of the plurality of network interface devices communicates with communication entities in the respective cell using superframes of the respective cell,
each superframe includes a plurality of radio frames and a control portion for broadcast signals and a data portion for user data,
a first portion of the broadcast signals is transmitted once each superframe, and a second portion of the broadcast signals is transmitted more than once each superframe,
the transmission of the second portion of the broadcast signals in the superframes of a first one of the plurality of cells is aligned with the transmission of the second portion of the broadcast signals in the superframes of a second one of the plurality of cells, and the superframes of the first one of the plurality of cells are shifted in time with respect to the superframes of the second one of the plurality of cells.

* * * * *